(No Model.)  5 Sheets—Sheet 1.
H. N. GALE.
STEAM ENGINE.
No. 377,247.  Patented Jan. 31, 1888.
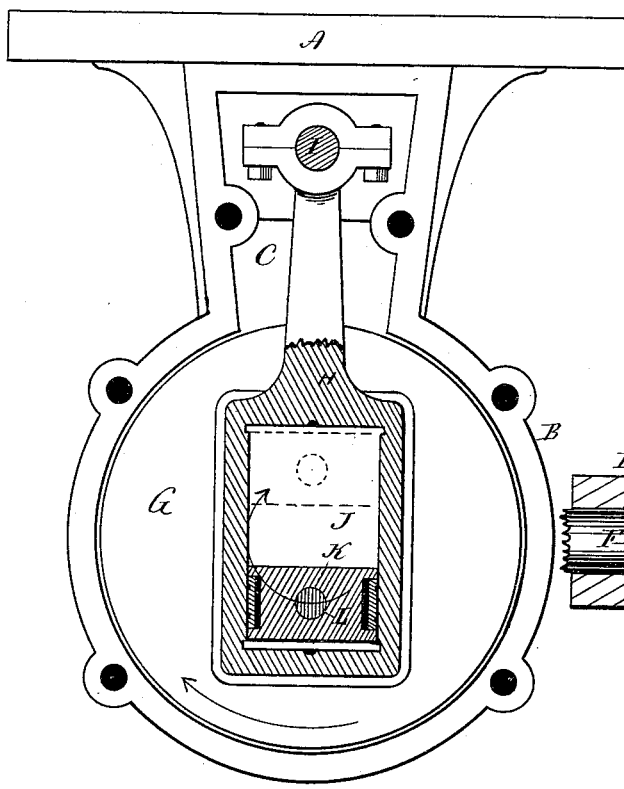
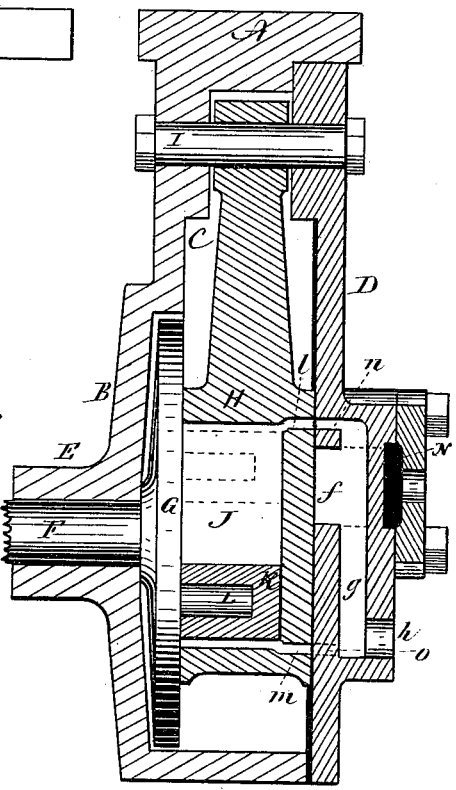
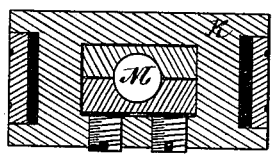
WITNESSES.
Howard Ames.
J. H. Shumway.
Herbert N. Gale,
INVENTOR,
By Atty,
Jno. E. Earle.

(No Model.)

5 Sheets—Sheet 2.

H. N. GALE.
STEAM ENGINE.

No. 377,247. Patented Jan. 31, 1888.

WITNESSES,
Howard Ahms.
J. H. Shumway.

Herbert N. Gale
INVENTOR,
By Atty (No Model.) 5 Sheets—Sheet 3.

H. N. GALE.
STEAM ENGINE.

No. 377,247. Patented Jan. 31, 1888.

WITNESSES.
Howard Ames.
J. H. Shumway.

Herbert N. Gale,
INVENTOR,
By Atty.

(No Model.)

H. N. GALE.
STEAM ENGINE.

No. 377,247. Patented Jan. 31, 1888.

Witnesses,
J. H. Shumway.
Fred C. Earle.

Herbert N. Gale,
Inventor
By atty, (No Model.)  H. N. GALE.  5 Sheets—Sheet 5.

STEAM ENGINE.

No. 377,247.  Patented Jan. 31, 1888.

WITNESSES.
Howard Ames.
J. H. Shumway.

Herbert N. Gale,
INVENTOR.
By atty

UNITED STATES PATENT OFFICE.

HERBERT N. GALE, OF BRISTOL, CONNECTICUT, ASSIGNOR OF ONE-HALF TO FRED A. DENNETT, OF SHEBOYGAN, WISCONSIN.

STEAM-ENGINE.

SPECIFICATION forming part of Letters Patent No. 377,247, dated January 31, 1888.

Application filed September 26, 1887. Serial No. 250,659. (No model.)

*To all whom it may concern:*

Be it known that I, HERBERT N. GALE, of Bristol, in the county of Hartford and State of Connecticut, have invented a new Improvement in Steam-Engines; and I do hereby declare the following, when taken in connection with accompanying drawings and the letters of reference marked thereon, to be a full, clear, and exact description of the same, and which said drawings constitute a part of this specification, and represent, in—

Figure 4:
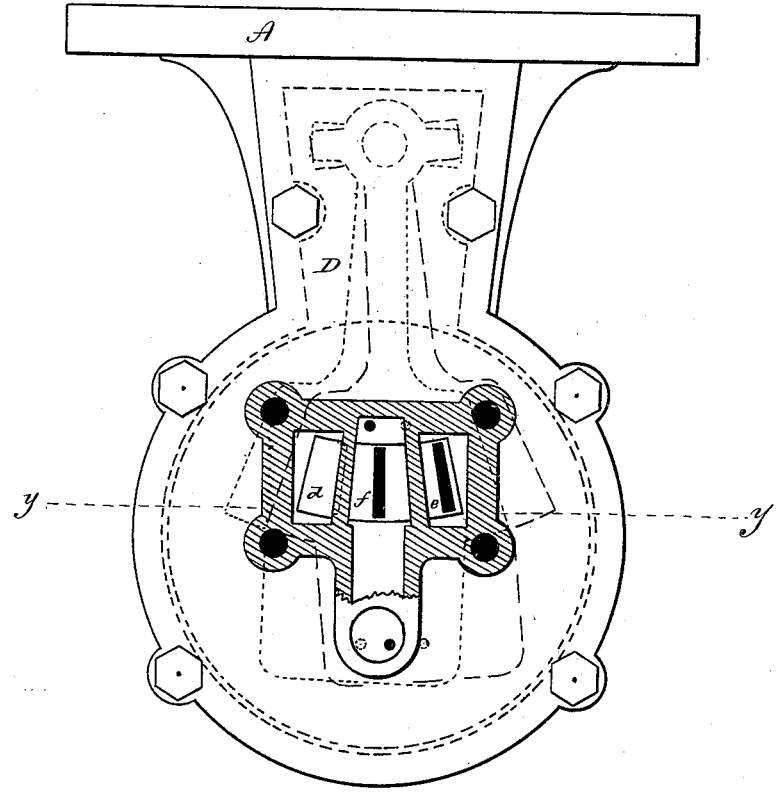
Figure 5:
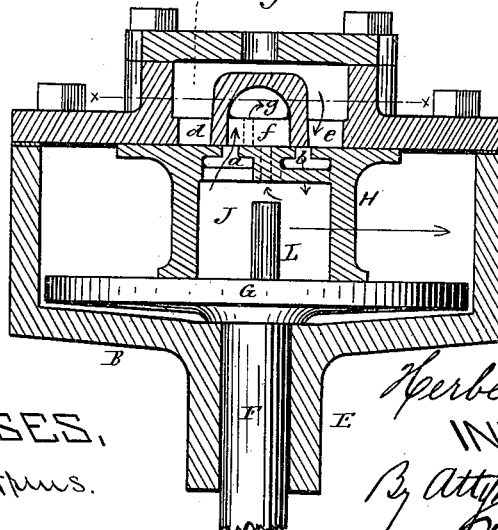
Figure 6:
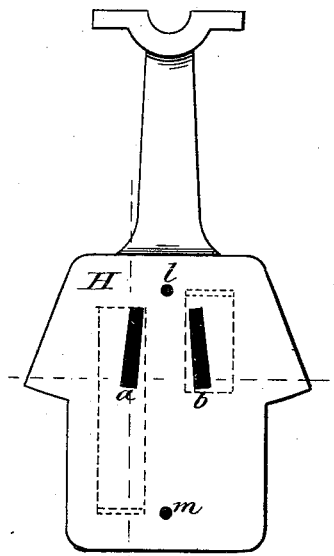
Figure 7:
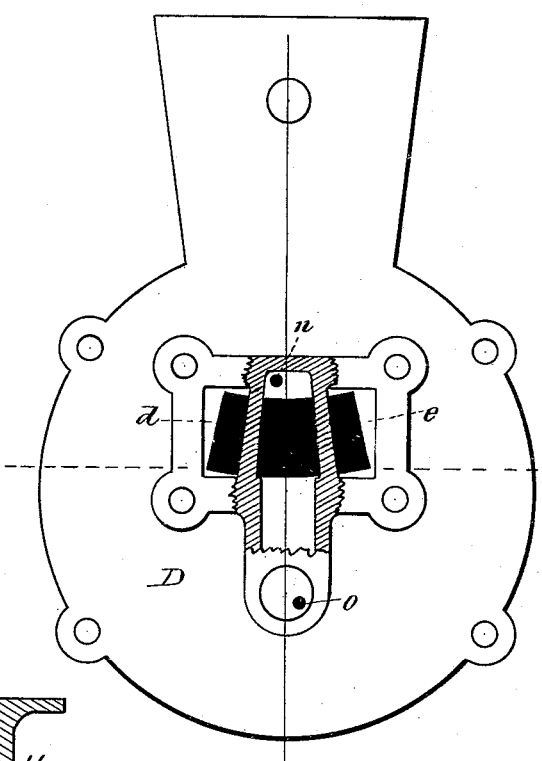
Figure 8:
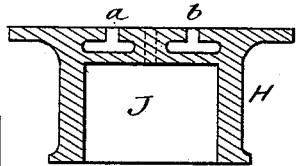
Figure 9:
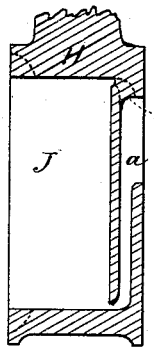
Figure 10:
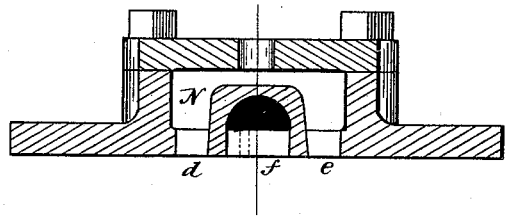
Figure 14:
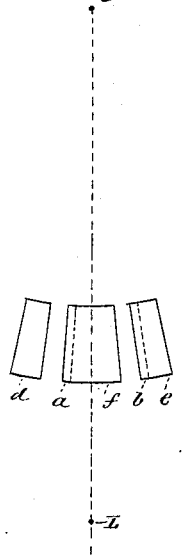
Figure 15:
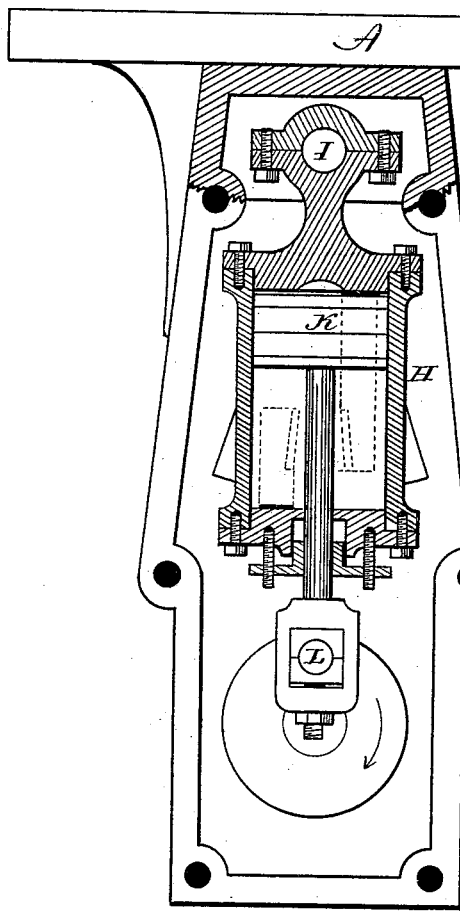
Figure 16:
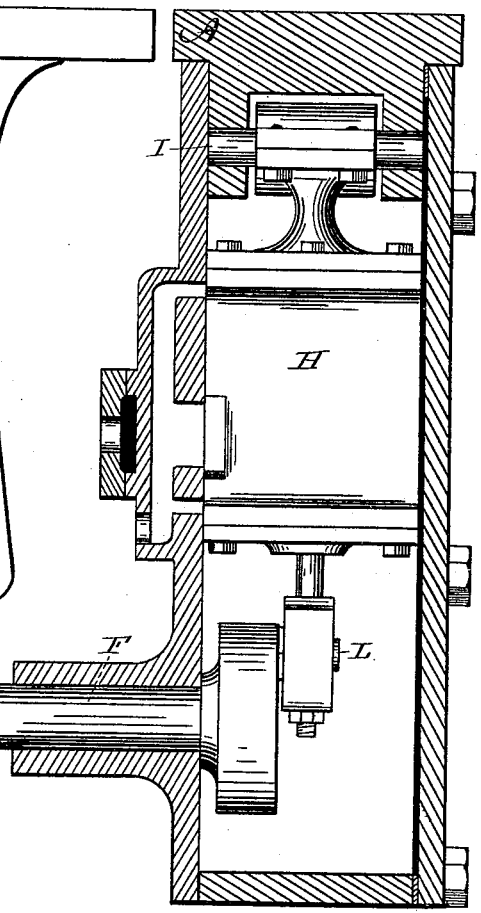

Figure 1, a side view of the casing, the covering-plate removed, and showing the cylinder and piston in vertical section; Fig. 2, a vertical section through the casing and cylinder, cutting on the line of the axis of vibration; Fig. 3, a detached sectional view of the piston; Fig. 4, a vertical section at right angles to the axis of vibration, cutting through the steam and exhaust passages on line $x\,x$ of Fig. 5, showing the ports of the cylinder as taking full steam at one side and as under full exhaust; Fig. 5, a horizontal section, cutting on line $y\,y$ of Fig. 4; Fig. 6, a port side view of the cylinder; Fig. 7, a side view of the casing, the cap of the steam-chest removed and in partial section to show the exhaust-passage; Fig. 8, a transverse section through the cylinder, cutting through the ports; Fig. 9, a vertical section of the cylinder, cutting through the port $a$; Fig. 10, a transverse section through the covering-plate and steam-chest; Figs. 11, 12, 13, and 14, diagrams illustrating the operation of the valve; Fig. 15, a sectional view of a modification, cutting at right angles to the axis; Fig. 16, a vertical sectional view, cutting on the line of the axis of vibration.

This invention relates to an improvement in steam-engines, and has for its object a simple construction of engine which is adapted to be suspended from the ceiling and in direct connection with the shaft to be driven, yet adapted for general uses where steam-power is required, parts of the invention being applicable to various classes of steam-engines.

In illustrating the engine I show it in the form of a hanger—that is, in a form to be suspended from the ceiling, in line with the shaft to be driven, but adapted to be inverted to rest upon the floor or suitable foundation, and power taken from the shaft in the usual manner of taking power from the driving-shaft of steam-engines.

A represents the base, which is made as a part of a casing. The main body B of the casing is of cylindrical shape, the axis of the cylinder being horizontal and the casing extends from one side to the base, forming a recess, C, opening into the body B of the casing, as seen in Figs. 1 and 2. The casing is cast with the base closed upon one side, and the opposite side closed by a covering-plate, D, which is bolted to the casing, so as to form a tight chamber within the case.

Concentrically in one side of the body of the casing a bearing, E, is formed, in which the shaft F rests. To the shaft F, within the casing, a disk, G, is applied, made fast to the shaft. This disk forms the crank by which the shaft is to be driven. The inner surface of the disk is flat and smooth and parallel with the opposite side of the case. Between the inner face of the disk G and the opposite side of the case the piston-cylinder H is arranged, and is suspended from an axis, I, in the chamber C above, and so that the cylinder may vibrate within the case. The side of the cylinder next the disk G is open, so that the cylinder forms a chamber, J, the disk G closing one side of that chamber. Within the cylinder the piston K is arranged, and so as to work up and down in the cylinder in the usual manner for the piston of common steam-cylinders; but as here represented and as preferred in this construction the chamber of the cylinder is square in transverse section, as seen in Fig. 5. and the piston of corresponding shape. The piston is provided with the usual packing, as represented in Fig. 3, and so as to bear upon the three sides of the cylinder-chamber J, and upon the other side against the face of the disk G. The disk G is provided with a crank-pin, L, which works in a suitable bearing, M, in the piston, as represented in Fig. 2.

As the piston travels up and down in the cylinder under force applied to it, it will act through the crank L upon the disk G and impart rotation to that disk and thence to the shaft. At the same time the piston, being suspended from an axis above, will vibrate within the casing and upon the face of the disk to adapt itself to the circular movement produced by the connection of the piston with the crank-pin of the disk G.

In the side of the casing opposite the crank-disk the steam-chest N is arranged, (see Fig. 5,) and on the same side the cylinder H is constructed with two ports, a b, the one, a, of which leads to the upper end of the cylinder, and the other, b, to the lower end of the cylinder. (See Figs. 6, 8, and 9.) These ports are in lines radiating from the center or axis upon which the cylinder is hung, and open against the inner surface of the covering-plate D. The corresponding side of the covering-plate is constructed with two openings, d e, from the steam-chest against the port side of the cylinder, and between the two openings d e is an exhaust-opening, f, into a passage, g, which leads to an outlet, h. The several steam-openings d e and the exhaust-opening f, like the ports a b, are in lines radiating from the center or axis upon which the cylinder is hung, and the openings in the case or steam-chest and to the exhaust are in the path of the ports a b of the cylinder, and so that in the vibration of the cylinder within the case the ports pass back and forth over said openings d, e, and f in the casing.

Under the vibrating movement of the cylinder, starting from one extreme at one side, one port—say a—first receives steam through the passage d from the steam-chest upon one side of the piston, while the steam upon the reverse side will escape through the port b and through the exhaust-opening f. Under the action of the steam the piston is driven to the opposite end of the cylinder, which brings the cylinder to the other extreme, when the port b will register with the opening e and take steam from that end. At the same time the opening a is brought to register with the exhaust-opening f, and the steam previously admitted upon the first side of the cylinder will escape, and the piston, consequently returned in the cylinder, will return the cylinder to its first position, and in this full reciprocating movement of the piston it imparts a corresponding full revolution to the disk G through the crank-pin, and thus, under the action of the steam first upon one side of the piston and then upon the other, the piston will impart continuous rotary movement to the disk, and the cylinder thereby receive a corresponding vibratory movement.

The openings in the case practically form the valve for the induction and eduction of the steam.

The exhaust-opening in the valve is in width equal to one-half or little more of the full vibration of the cylinder on a line through the exhaust-passage, and is so arranged with relation to the ports of the cylinder that the exhaust-port comes to one side of the exhaust-opening as the piston completes its movement toward one end of the cylinder. Then as the piston moves toward the opposite end, and under the vibration imparted to the cylinder thereby, the exhaust-port passes across the exhaust-opening in one direction under one-half the movement of the piston, and then under the other half returns to the opposite side and passes from the exhaust-opening as the piston reaches the other extreme of the cylinder; but the two openings d e of the valve are less in width than one-half the movement of the ports, and so that as the port opens to one of the passages d e as the cylinder moves in one direction the port will travel over that opening from the exhaust side and pass beyond the opposite side of the opening in the completion of the half-stroke of the piston, and then in the completion of the other half-stroke the port will be returned across the said opening d or e in the valve, as the case may be; hence the induction is made to the cylinder through the inlet-port at the commencement of the stroke of the piston, continued during the first portion of that stroke, cut off through the central portion as the port passes from the inlet-opening, and the steam again admitted as the port returns over the said inlet-opening toward the completion of the stroke of the piston. Under this arrangement the steam acts under full force at the beginning of the stroke of the piston, and then again works directly during the last part of the stroke of the piston. Thus the greatest force of steam is applied at the two extremes where greater power is required, and the expansive force is applied only through the intermediate portion where less power is required.

Figure 11:
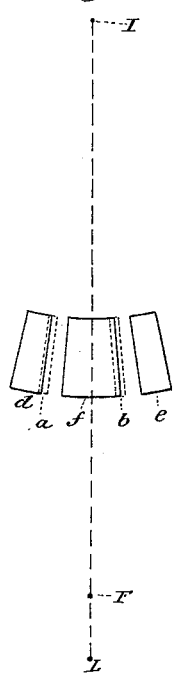
Figure 12:
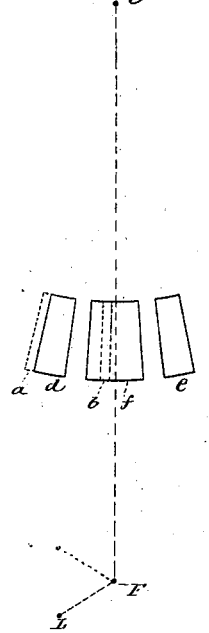
Figure 13:
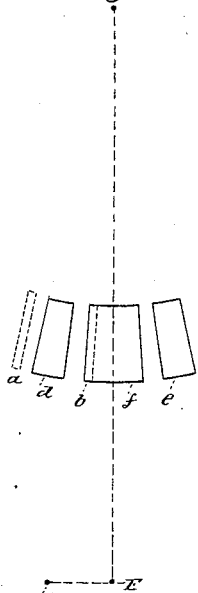

To illustrate, Fig. 11 represents the steam-openings d e and the exhaust-opening f in solid lines. Broken lines represent the ports, the cylinder moving in the direction indicated by arrow. The piston is now in its downstroke. The central vertical line represents the central line through the cylinder, the point I representing the axis upon which the cylinder is hung, F the center of the shaft, and L the crank-pin. The port a is just commencing to take steam, which will pass to the lower side of the piston. At the same time the port b has just passed onto the exhaust-opening f. The piston under the action of steam at once commences to rise, and the port a moves across the passage d of the valve and passes from that passage, as indicated in Fig. 12, before the crank has reached its half-stroke, the exhaust still being open. The piston continues its movement under expansive action of the steam until the crank comes to the central position represented in Fig. 13, at which time the port a has passed to a considerable distance beyond the opening d, and the exhausting-port has reached the side of the exhaust-opening opposite to that from which it started. The return of the cylinder now commences, still under the expansive action of steam, until the crank has reached the position indicated in broken lines, Fig. 12, which has brought the port a again to register with the valve-opening d, so that now the cylinder again takes steam, which continues until the stroke of the piston is completed, as indicated in Fig. 14. The exhausting-port $b$ has returned across the exhaust-opening to the side from which it started and has passed from the exhaust-opening $f$ and onto the opening $e$, while the port $a$ has in its turn passed onto the exhaust-opening, so that now the port $b$ is taking steam to its side of the cylinder, while the opposite side is exhausting, and the port $b$ will pass over the valve-opening $e$ on its side and beyond, as did the port $a$ pass over and beyond the valve-opening $d$, while the now exhausting-port $a$ will pass across the exhaust-opening and return as did the port $b$ when the piston was moving in the opposite direction, so that the action of the steam will be direct at the beginning of the stroke of the piston, work expansively midway of its stroke, and again the piston receive direct steam as it completes its stroke. Thus it will be observed that steam is applied to the piston where the power required is greatest, and works expansively where the least power is required upon the crank.

The extent to which the steam is worked expansively will of course depend upon the width of the valve-openings $d$. If those openings be less, then the extent of working expansively will be greater, and if the ports be broader then the extent of expansive working will be less; but in either case the ports pass beyond the inlet-openings of the valve midway of the stroke and cause the steam to work expansively midway of the stroke, but open direct action of the steam upon the piston during the first and last portions of the stroke. This same arrangement of stationary valve-openings and the openings in the cylinder may be applied to an oscillating engine, as represented in Figs. 15 and 16. In this case the cylinder H is hung upon a pivot, $i$, as before; but instead of making the piston to connect directly within the cylinder to the crank-pin the piston K is provided with a piston-rod, which is connected to the crank-pin L of the shaft F; but it will be observed that the vibration or oscillation of the cylinder having ports the same as the cylinder in the first illustration, and the stationary valve also having the same openings as the stationary valve in the first illustration, the same result will be attained. The cylinder being inclosed within the case, it is necessary that some provision shall be made for the escape of water arising from condensation. To do this, I provide the cylinder at its upper end with a small aperture, $l$, and at its lower end with a like small aperture, $m$, (see Figs. 2 and 6,) which open toward the valve-surface and into the exhaust-passage. I make corresponding apertures, $n$ $o$, (see Figs. 2 and 7,) the apertures $n\ o$ in the valve-surface being in the path of the apertures $l\ m$ of the cylinder, and so that at certain points in the movement of the cylinder these apertures will register the one with the other and so as to open into the cylinder. The duration of this opening is of course short; but as the registering occurs at about the extreme up and down movements of the piston it is sufficient to permit the escape of the water in the cylinder in advance of the piston. This registering of the openings occurs at each stroke. Consequently there is no opportunity for accumulation of water in the cylinder. These apertures serve the purpose of the pet-cocks usually applied to steam-cylinders in the common construction of steam-engines; but in case the two sides of the cylinder vibrate between two stationary surfaces, as in the modification, Figs. 15 and 16, the escape-apertures may be upon the side opposite the valve-surface, as indicated in broken lines at the left in Fig. 9. Under this arrangement the apertures open from the cylinder-chamber above and below the cylinder, but would pass corresponding apertures in the surface in the same manner as I have described for the apertures formed on the valve-surface. I therefore do not wish to be understood as limiting this part of my invention to the location of the apertures on the valve side of the cylinder, yet I prefer that arrangement.

I claim—

1. In a steam-engine, the combination of a casing, a cylinder hung upon an axis within said casing and so as to vibrate therein, one side of the cylinder closed, said closed side working in close contact with one side of the casing, a disk fixed to a shaft in the opposite side of the casing, the axis of said shaft being parallel with the axis of vibration of the said cylinder, and the other side of said cylinder working in close contact with said disk and the disk side of the cylinder open against the disk, a piston arranged in the said cylinder, a crank-pin on said disk in connection with said piston, a steam-chest, and an exhaust-passage in the casing on the closed side of the cylinder, the closed side of the cylinder constructed with ports for the admission and outlet of steam, and that side of the case constructed with valve-openings from the steam-chest and into the exhaust-passage, substantially as described.

2. In a steam-engine, the combination of a cylinder carrying a piston adapted to reciprocate therein and communicate power therefrom, the said cylinder hung upon an axis at right angles to the path of the piston, a stationary valve-surface against which one side of said cylinder works in close contact, the said valve-surface provided with a steam-chest and an exhaust-passage, the said cylinder constructed with two ports on the valve side with passages therefrom, the one opening to one end of the cylinder and the other to the opposite end of the cylinder, the valve-surface constructed with two openings to the steam-chest and with an intermediate opening to the exhaust, the said openings in the valve surface being in the path of the ports of the cylinder, the width of the exhaust corresponding substantially to the extent of one-half of the movement of the cylinder in a full vibration, the steam-openings less in width than the said one-half movement of the cylinder in a full vibration, substantially as described, and whereby as the cylinder passes to either extreme the port in the cylinder receiving steam will pass beyond the opening from the steam-chest during one-half the stroke, but return during the other half of the stroke, while the exhaust-port will pass from one side of the exhaust-opening to the opposite side during the first half of the same stroke and return during the last half of the stroke, substantially as described.

3. In a vibrating-cylinder engine in which the cylinder vibrates in close contact with a stationary surface, the said cylinder provided with ports for the admission and escape of steam, the cylinder constructed with apertures $l\,m$ onto said surface, but independent of said steam-ports, the said apertures being respectively at the extreme ends of the cylinder, and the said surface constructed with corresponding apertures, $n\,o$, with which the said apertures $l\,m$ of the cylinder are adapted to register at about the extreme strokes of the piston, substantially as and for the purpose described, the said apertures being adapted for the escape of the water of condensation independent of the steam-ports.

HERBERT N. GALE.

Witnesses:
JOHN E. EARLE,
FRED C. EARLE.